United States Patent
Hesse et al.

(10) Patent No.: US 9,457,427 B2
(45) Date of Patent: Oct. 4, 2016

(54) DETECTING AN INCOMPLETE CUTTING ACTION

(71) Applicant: TRUMPF Werkzeugmaschinen GmbH + Co. KG, Ditzingen (DE)

(72) Inventors: Tim Hesse, Ditzingen (DE); David Schindhelm, Stuttgart (DE); Boris Regaard, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 208 days.

(21) Appl. No.: 14/286,014

(22) Filed: May 23, 2014

(65) Prior Publication Data

US 2014/0346150 A1 Nov. 27, 2014

(30) Foreign Application Priority Data

May 23, 2013 (DE) .......... 10 2013 209 526

(51) Int. Cl.
| | |
|---|---|
| *B23K 10/00* | (2006.01) |
| *B23K 26/03* | (2006.01) |
| *B23K 26/38* | (2014.01) |
| *B23K 31/12* | (2006.01) |

(52) U.S. Cl.
CPC ............ *B23K 26/032* (2013.01); *B23K 10/00* (2013.01); *B23K 10/006* (2013.01); *B23K 26/38* (2013.01); *B23K 26/702* (2015.10); *B23K 31/12* (2013.01); *B23K 31/125* (2013.01)

(58) Field of Classification Search
CPC .... B23K 26/032; B23K 26/38; B23K 10/00; B23K 10/006; B23K 31/12; B23K 31/125; B23K 26/702; H05H 1/26; H05H 1/36
USPC ............ 219/121.39, 121.44, 121.54, 121.45, 219/121.46, 121, 59, 121.67, 121.72, 219/124.34, 130.01
See application file for complete search history.

(56) References Cited

U.S. PATENT DOCUMENTS

| | | | | |
|---|---|---|---|---|
| 5,045,668 A | * | 9/1991 | Neiheisel | B23K 26/032 219/121.63 |
| 5,463,202 A | | 10/1995 | Kurosawa et al. | |
| 5,811,055 A | * | 9/1998 | Geiger | B23K 9/0061 266/48 |
| 6,822,188 B1 | * | 11/2004 | Kratzsch | B23K 26/032 219/121.64 |
| 7,687,373 B2 | | 3/2010 | Sekiya | |
| 9,044,824 B2 | | 6/2015 | Olsen | |
| 2006/0096426 A1 | * | 5/2006 | Park | B23K 26/0057 83/13 |
| 2009/0250445 A1 | * | 10/2009 | Yamaguchi | B23K 10/006 219/121.72 |
| 2010/0314362 A1 | * | 12/2010 | Albrecht | B23K 9/0953 219/121.63 |
| 2010/0326962 A1 | * | 12/2010 | Calla | B23K 9/0956 219/76.14 |

(Continued)

FOREIGN PATENT DOCUMENTS

| | | |
|---|---|---|
| CN | 101714499 A | 5/2010 |
| CN | 101733558 A | 6/2010 |

(Continued)

*Primary Examiner* — Mark Paschall
(74) *Attorney, Agent, or Firm* — Fish & Richardson P.C.

(57) ABSTRACT

Methods, devices and systems for detecting an incomplete cutting action when cutting a workpiece with a high-energy beam are disclosed. In one aspect, a method includes taking an image of a region of the workpiece to be monitored, the region including an interaction region of the high-energy beam with the workpiece, evaluating the image taken in order to detect pooled slag at an end of the interaction region opposite a cutting front, and detecting whether a related cutting action is incomplete based on an occurrence of detection of pooled slag.

20 Claims, 2 Drawing Sheets

(56) References Cited

U.S. PATENT DOCUMENTS

2013/0178952 A1* 7/2013 Wersborg ............ B23K 1/0056
                                                    700/47
2013/0319980 A1   12/2013 Hesse et al.

FOREIGN PATENT DOCUMENTS

| CN | 101170075 B    | 11/2011 |
| DE | 4336136 C2     | 3/2001  |
| DE | 102011003717 A1 | 8/2012  |
| EP | 0470583 A2     | 2/1992  |
| EP | 1886757 A1     | 2/2008  |
| JP | 04105780 A     | 4/1992  |
| JP | 06142960 A     | 5/1994  |
| JP | 10015679 A     | 1/1998  |
| JP | 11129083 A     | 5/1999  |
| JP | 201138082 A    | 5/2001  |
| JP | 2001138082 A   | 5/2001  |
| JP | 2010508149 A   | 3/2010  |
| JP | 2012071340 A   | 4/2012  |

* cited by examiner

DETECTING AN INCOMPLETE CUTTING ACTION

CROSS REFERENCE TO RELATED APPLICATION

This application is a continuation of and claims priority under 35 U.S.C. §119 to German Application No. 10 2013 209 526.0 filed on May 23, 2013. The content of this priority application is hereby incorporated by reference in its entirety.

TECHNICAL FIELD

The present invention relates to methods, devices and systems for detecting an incomplete cutting action when cutting a workpiece with a high-energy beam.

BACKGROUND

When thermally cutting a workpiece, e.g., a metal workpiece, with a high-energy beam, e.g., a plasma beam or a laser beam, an incomplete cutting action may occur. The high-energy beam may no longer cut through the workpiece completely since an energy per unit length is not sufficient to melt a complete cutting gap volume. This may be due to an excessively high feed speed, an excessively low power of the high-energy beam, an excessively low oxygen gas pressure, or an excessively powerful defocusing of the high-energy radiation used. When the incomplete cutting action occurs, a cutting joint or a cutting gap is no longer defined over the entire workpiece thickness, and the high-energy beam may cut only a groove in the workpiece.

SUMMARY

Described below are methods, devices and systems for reliable detection of an incomplete cutting action when a workpiece is cut with a high-energy beam.

One aspect of the invention features a method that includes taking an image of a region of the workpiece, the region including an interaction region of the high-energy beam with the workpiece, evaluating the taken image to detect pooled slag at an end of the interaction region opposite a cutting front; and then determining whether a related cutting action is incomplete based on an occurrence of detection of pooled slag.

In the event of an incomplete cutting action, the path energy may be insufficient to melt the complete cutting gap volume. Accordingly, the slag can no longer be discharged downwards out of the cutting gap. Instead, it flows counter to a feed direction in a partially defined cutting channel backwards towards an upper side of the workpiece and is discharged at a location from the cutting gap which is formed during the cutting operation.

The iron oxide (FeO) which is produced during a reaction with a cutting gas, e.g., oxygen, used during a cutting operation, e.g., a flame-cutting operation, has a density of approximately 5.7 kg/dm$^3$, which is 27% lower than the original iron (Fe) which forms the base material or a large proportion of the base material of the workpiece to be processed. As a result both of the reduction of the FeO density and the mass increase during the oxidation, the volume of slag produced is consequently subjected to an increase in volume with respect to the base material. This leads to the slag which cannot be discharged in a downward direction subsequently being discharged backwards in an upward direction from the cutting gap. This pooled slag (or drops of slag) which oozes out backwards in an upward direction can be detected in the region to be monitored, an image of which is taken during the cutting process. Note that the terms "pooled slag" and "drops of slag" are used interchangeably.

By cutting experiments, a direct relation of these drops of slag with an incomplete cutting action, in particular during flame-cutting, has been shown. In the case of a good cut, or even in the event of burr formation, such a flow of slag was not observed.

In a variant of the method, the taking of the image involves taking a thermal image of the interaction region. The drops of slag being discharged can be seen, e.g., particularly clearly, in the thermal image of the interaction region which corresponds to a process-inherent radiation of the cutting process, in particular of a laser cutting process, at a wavelength which is emitted by the melt. The thermal image, in particular in the NIR-A range, for example, at wavelengths of approximately 800-1100 nm, has been found to be particularly advantageous for the detection of the drops of slag based on the lack of thermal radiation in a region of the thermal image shielded by the drops of slag. The thermal image can be taken using an appropriate camera which is sensitive in this wavelength range. A detection of the process radiation or the taking of an image of the interaction region is also possible at other wavelengths, for example, in the UV range. In this instance, for example, the process radiation brought about by the plasma of a plasma beam can be detected.

In another variant, the taking of the image involves taking an externally illuminated image of the interaction region. Using external illumination, for example, incident light illumination, of the interaction region or the region of the workpiece to be monitored, by means of radiation at appropriate wavelengths, for example, in the visible wavelength range (VIS), contours on the upper side of the workpiece can be made apparent. The drops of slag are detected in this case when the surface or the upper side of the workpiece is no longer visible in the region of the drop of slag. In some examples, a combined detection of the thermal image and the externally illuminated image of the interaction region is used.

In some implementations, the image of the interaction region is taken coaxially relative to a beam axis of the high-energy beam. This enables direction-independent observation. The decoupling of the secondary radiation, e.g., thermal radiation, from the beam path of the high-energy beam for the coaxial observation may be carried out by means of a scraper mirror or a dichroic mirror. In some cases, incident light illumination is adopted.

The image of the interaction region may be taken through a nozzle opening of a processing nozzle, e.g., a laser processing nozzle, for a passage of the laser beam onto the workpiece, e.g., coaxially with respect to the processing beam. In this case, the image of the region of the workpiece to be monitored is taken through the laser cutting nozzle and optionally through a focusing lens by a camera. For example, in the event of $CO_2$ laser beam cutting, the region of the workpiece to be monitored can be observed coaxially relative to the laser beam by means of a camera through a lens of a material which is transparent with respect to $CO_2$ laser radiation, e.g., ZnSe, and the laser cutting nozzle. When laser radiation at different wavelengths is used, optical elements of material which is transmissive at the respective laser wavelength can be used. In place of a transmissive focusing element or a transmissive focusing device, a reflective focusing element, e.g., an off-axis parabolic mirror may be used.

In some cases, in order to detect the drops of slag, the image taken is evaluated, e.g., only at an edge of the inner contour of the nozzle opening at the end of the interaction region opposite the cutting front. The drops of slag may occur in a region which directly adjoins the edge of the inner contour of the nozzle opening so that it is sufficient for the evaluation of the image taken for the edge region which is formed by the inner contour of the nozzle opening to be examined precisely in order to ensure rapid detection of the drops of slag and consequently rapid detection of an incomplete cutting action.

In some examples, the drops of slag are detected based on an occurrence of a local intensity minimum of the image of the end of the interaction region opposite the cutting front. The drops of slag may produce an intensity minimum in the thermal image of the interaction region so that, when such an intensity minimum is present, the existence of drops of slag can be determined. A measured value for the intensity of the thermal radiation in the region of the intensity minimum approximately corresponds in this case to the value or is slightly below the value of the intensity of the thermal radiation which is measured in the region to be monitored outside the interaction region.

The drops of slag can be also detected based on a change of the geometry of the interaction region at the end thereof opposite the cutting front. The drops of slag may, for example, lead to the otherwise convex outwardly curved end of the interaction region changing the geometry thereof in the thermal image and in particular assuming a geometry which is substantially straight or, where applicable, curved in a concave manner, i.e., directed into the interaction region.

In some implementations, when the incomplete cutting action is detected or determined or in response to determining that the related cutting action is incomplete, the cutting process can be acted on in a controlling or adjusting manner. In some examples, at the beginning of an incomplete cutting action, one or more cutting parameters of the cutting process can be adapted in a suitable, e.g., controlled or adjusted, manner in order to counteract an incomplete cutting action when the laser cutting process is continued. In some examples, when the incomplete cutting action is detected, the cutting process can be interrupted and/or optionally to start the cutting process again in order to process the affected location again.

Another aspect of the invention features a device for detecting an incomplete cutting action when a workpiece is cut with a high-energy beam. The device includes an image recording device for taking an image of a region of the workpiece. The region includes an interaction region of the high-energy beam with the workpiece. The device also includes an evaluation unit or device which is constructed or programmed to evaluate the image which has been taken, to detect pooled slag at an end of the interaction region opposite a cutting front, and to determine that a related cutting action is incomplete based on an occurrence of detection of pooled slag.

In some cases, to monitor the cutting process, the image recording device takes an image of a detail, e.g., a monitored region, of the workpiece during a cutting operation, i.e., during a relative movement between the high-energy beam and the workpiece. The evaluation device can be constructed or programmed to, based on the image taken, carry out a detection of the pooled slag or the drops of slag downstream of the cutting process and determine an incomplete cutting action in the event of detection, e.g., repeated detection, of drops of slag.

In addition to the image recording device which, in order to monitor the cutting process, takes an image of a detail (that is to say, of a monitored region) of the workpiece during a cutting operation, that is to say, during a relative movement between the high-energy beam and the workpiece, there may be provided in the device according to the invention an evaluation unit which is constructed or programmed, based on the image taken, to carry out a detection of the drops of slag downstream of the cutting process and to determine an incomplete cutting action in the event of (repeated) detection of drops of slag.

In some implementations, the image recording device is constructed to take a thermal image or the process-inherent irradiation of the interaction region. The image recording device may be sensitive at least in the NIR/IR wavelength range. Using the image recording device, a detection of the drops of slag and consequently identification of the incomplete cutting action can take place based on an image taken in the NIR/IR range. The interaction region or the geometry thereof may in this case be observed by means of the image recording device via a suitable wavelength filter, which is permeable with respect to wavelengths, e.g., in the near infrared range or in the UV range for detection of a plasma illumination of a plasma beam. The image recording device may have different detectors for detecting the interaction region and for detecting material delimitations of the workpiece.

In some implementations, the image recording device is constructed to take an externally illuminated image of the interaction region. For external illumination, e.g., incident light illumination, there may be provided an additional illumination source which directs the illumination radiation either coaxially relative to the laser beam or off-axis onto the workpiece, more specifically, onto the region of the workpiece to be monitored.

In some cases, a single detector, e.g., a CCD or CMOS camera, together with a suitable wavelength filter for detecting both the interaction region in the NIR/IR range and material delimitations, e.g., in the visible wavelength range, may be used, which may be advantageous for both space-saving and cost-effective.

In some examples, the image recording device is constructed to record the region to be monitored coaxially with respect to the beam axis of the high-energy beam. A coaxial detection of the region to be monitored is possible independently of the cutting direction. The image recording device may optionally also be constructed for non-coaxial recording of the region to be monitored.

The image recording device can be constructed to take the image of the interaction region through a nozzle opening of a laser processing nozzle for a passage of the laser beam onto the workpiece. In this case, the region to be monitored is observed through the laser processing nozzle, e.g., coaxially relative to the laser beam, a round inner contour of the laser processing nozzle forming the delimitation of the region to be monitored.

In some implementations, the evaluation device is constructed or programmed, in order to detect the drops of slag, to evaluate the image taken, e.g., optionally exclusively, at the edge of the inner contour of the nozzle opening. The drops of slag are formed downstream of the cutting process, e.g., at the interaction region end opposite the cutting front, which region is located at the edge of the inner contour of the nozzle opening. Owing to the evaluation of the image taken, e.g., optionally exclusively, in this edge region, a detection of the drops of slag and consequently the detection of the incomplete cutting action can be carried out.

In some cases, the evaluation device is constructed or programmed to detect the drops of slag based on the occurrence of a local intensity minimum of the image of the end of the interaction region opposite the cutting front. The drops of slag may lead to a shadowing of the interaction region at the end thereof opposite the cutting front so that, by detecting an intensity minimum in this region, the presence of drops of slag can be determined.

In addition or alternatively, the detection of the drops of slag can also be detected by the evaluation device based on a detection of changes in the geometry of the interaction region at the end thereof opposite the cutting front since a geometry of the interaction region differs at that location in the event of the occurrence of drops of slag with respect to the geometry in the event of a good cut or when burr formation is present, the detection of the drops of slag can also be detected by the evaluation device based on a detection of changes in a geometry of the interaction region at the end thereof opposite the cutting front. In some cases, detection of drops of slag via the intensity minimum and/or via the change of the geometry of the interaction region can be adopted both when taking a thermal image and when taking an externally illuminated image of the interaction region.

The incomplete cutting action detected by the evaluation unit, by means of an evaluation which can take place both in the evaluation unit itself and in a logic unit which is arranged downstream thereof, e.g., a control or regulation unit, can be used to influence one or more parameters of the cutting process in order to counteract the beginning of an incomplete cutting action. In addition to the feed speed which is intended to be reduced in order to prevent an incomplete cutting action, the parameters of the cutting process that can be influenced, may include the power of the high-energy beam which is intended to be increased in order to prevent an incomplete cutting action. The focal point or the spacing between a cutting head provided for the cutting processing operation and the workpiece can also optionally be influenced in order to correct any defocusing which may be present, since this can also promote an incomplete cutting action.

Another aspect of the invention features a cutting system for cutting a workpiece and monitoring a cutting process. The system includes a beam source configured to generate a high-energy beam, a processing head arranged to guide the high-energy beam onto the workpiece, and a cut quality evaluator for detecting an incomplete cutting action when cutting the workpiece with the high-energy beam. The cut quality evaluator includes an image recorder configured to generate an image of an interaction region of the high-energy beam with the workpiece during cutting, and an image processor configured to evaluate the generated image and to thereby detect slag pooling at an end of the interaction region opposite a cutting front, and to determine whether an incomplete cutting action is occurring based on detected slag pooling.

The system can further include a controlling device coupled to the cut quality evaluator. The controlling device is configured to, in response to determining that an incomplete cutting action is occurring by the cut quality evaluator, perform one of control of one or more cutting parameters to counteract the incomplete cutting action or interruption of the cutting to start a new cutting of the workpiece Another aspect of the invention features a non-transitory computer readable storage medium storing instructions executable by a data processing apparatus and upon such execution cause the data processing apparatus to perform operations for detecting an incomplete cutting action when cutting a workpiece with a high-energy beam. The data processing apparatus may include a controlling device and/or an evaluation device. The operations may include one or more steps of the method described above. In some examples, the operations include taking an image of a region of the workpiece, the region including an interaction region of the high-energy beam with the workpiece; evaluating the taken image to detect pooled slag at an end of the interaction region opposite a cutting front; and determining whether a related cutting action is incomplete based on an occurrence of detection of pooled slag.

Other advantages of the invention will be appreciated from the description and the drawings. The features mentioned above and those set out below may also be used individually per se or together in any combination. The embodiments shown and described are not intended to be understood to be a conclusive listing but are instead of exemplary character for describing the invention.

DETAILED DESCRIPTION

Figure 1:
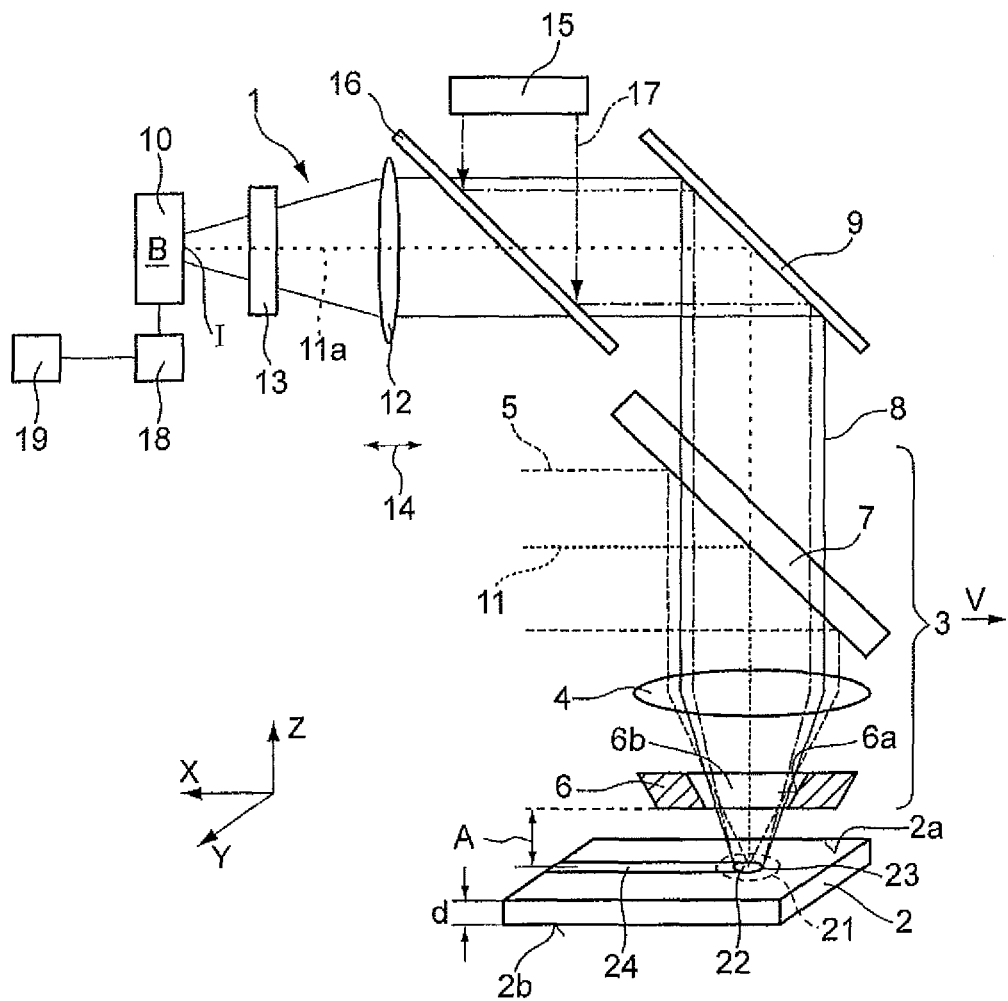
FIG. 1 is a schematic illustration of an example device for monitoring and controlling a laser cutting process.

FIG. 1 shows an exemplary construction of a device 1 for process monitoring and control of a laser cutting process on a workpiece 2 using a $CO_2$ laser processing installation. The device 1 includes a processing unit 3, e.g., part of a laser processing head, which has a focusing lens 4, e.g., made of zinc selenide, for focusing a $CO_2$ laser beam 5 of the laser processing installation, a cutting gas nozzle 6, and a redirection mirror 7. In the present case, the redirection mirror 7 is constructed so as to be partially permeable and forms an inlet-side component for the device 1 for process monitoring.

The redirection mirror 7 reflects the incident $CO_2$ laser beam 5, e.g., at a wavelength of approximately 10 μm, and transmits radiation 8 which is relevant for the process monitoring. The radiation 8 is reflected by the workpiece 2 and emitted from an interaction region 22 of the $CO_2$ laser beam 5 with the workpiece 2 in a wavelength range, e.g., between approximately 550 nm and 2000 nm. As an alternative to the partially permeable redirection mirror 7, a scraper mirror or an aperture mirror may also be used in order to supply the process radiation 8 to the device 1.

In the device 1 there is arranged behind the partially permeable mirror 7 another redirection mirror 9 which redirects the process radiation 8 onto a geometrically high-resolution camera 10 as an image recording unit. The camera 10 may be a high-speed camera which is arranged coaxially with respect to the laser beam axis 11 or to the extension of the laser beam axis 11a and is consequently independent of direction. In some implementations, the image is taken using the camera 10 with an incident light method in the VIS wavelength range, optionally also in the NIR wavelength range, as long as an additional illumination source which emits in the corresponding wavelength range is provided, and alternatively recording the process-inherent irradiation in the wavelength ranges UV and NIR/IR.

For the imaging, an imaging focusing optical system 12 can be provided between the partially permeable mirror 7 and the camera 10. The imaging focusing optical system 12 can include a lens that focuses the radiation 8 relevant for the process monitoring onto the camera 10.

In the example illustrated in FIG. 1, the device 1 includes a filter 13 upstream of the camera 10. The filter 13 is advantageous when other radiation or wavelength proportions are intended to be excluded from detection with the camera 10. The filter 13 may be constructed as a narrow-band bandpass filter. The position of the camera 10 and the imaging optical element 12 present in the present example and/or the filter 13 along the laser beam axis 11 can be adjusted and changed if necessary by means of a positioning system 14. The positioning system 14 can be any suitable system known to the person skilled in the art, which is illustrated for simplification by means of a double-headed arrow.

In the current example, the camera 10 is operated with the incident light method. An additional illumination source 15 is provided above the workpiece 2. The additional illumination source 15 couples illumination radiation 17 coaxially relative to the laser beam axis 11 into the beam path by means of another partially permeable mirror 16. As illustrated in FIG. 1, the additional illumination source 15, e.g., laser diodes or diode lasers, can be arranged coaxially but also off-axis with respect to the laser beam axis 11. The additional illumination source 15 may also be arranged outside, e.g., in particular beside, the processing unit 3 and directed onto the workpiece 2. Alternatively, the additional illumination source 15 may be arranged inside the processing unit 3, but not be directed coaxially with respect to the laser beam 5 onto the workpiece 2. In some cases, the device 1 may also be operated without an additional illumination source 15.

In the example illustrated in FIG. 1, the camera 10 takes an image B, which contains the interaction region 22 of a region 21 of the workpiece 2 to be monitored during a laser flame-cutting process. During the flame-cutting operation, there is a relative movement between the workpiece 2 and the nozzle 6 or the processing unit 3, e.g., a laser processing head, by the movement of the nozzle 6 or the processing unit 3 in the positive X direction, illustrated as an arrow in FIG. 1. Alternatively or in addition, the workpiece 2 can be moved in the opposing direction, e.g., negative X direction, relative to the nozzle 6 or the processing unit 3. In any case, there is a relative movement between the workpiece 2 and the processing unit 3 with a relative speed which is designated as a feed speed v. In the flame-cutting process, there is formed upstream of the interaction region 22 a cutting front 23 which is adjoined downstream, e.g., in the negative X direction, by a cutting gap 24 (also occasionally referred to as a cutting joint below).

Figure 2:
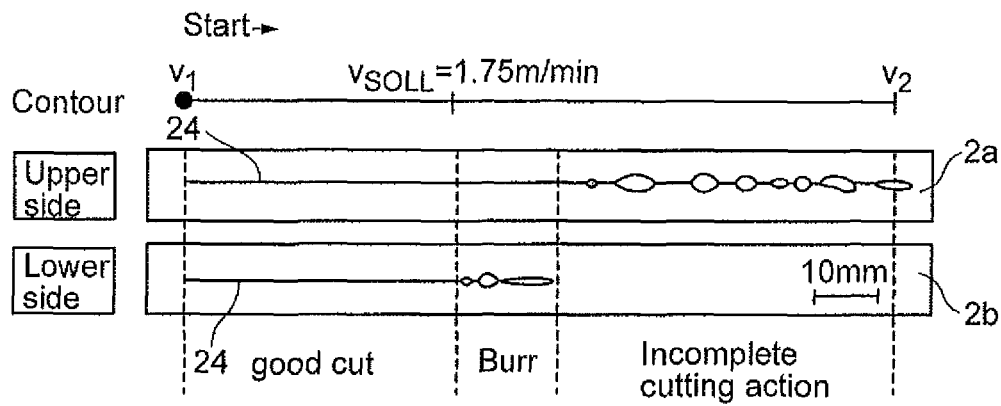
FIG. 2 shows an upper side and a lower side of a workpiece, in which a laser cutting process has been carried out with different feed speeds.

FIG. 2 shows a workpiece 2, e.g., a workpiece of construction steel, after a test-cut has been carried out using a linear, desired cutting contour as a plan view of both an upper side 2a and a lower side 2b. During the test cut, a linear speed ramp, e.g., with constant acceleration, is travelled on the workpiece 2 between a minimum feed speed $v_1$ and a maximum feed speed $v_2$.

As can be seen clearly in FIG. 2, at comparatively low feed speeds v below the standard feed speed $v_{soll}$=1.75 m/min used for the above-mentioned process parameters, a good cut is achieved, e.g., both at the upper side and at the lower side of the workpiece 2, a continuous, straight cutting gap 24 is obtained. At feed speeds v which are slightly greater than the standard feed speed $v_{soll}$, a formation of burrs begins, as can be seen in FIG. 2 at the lower side of the workpiece 2. At even higher feed speeds v up to the maximum feed speed $v_2$, an incomplete cutting action appears, e.g., the laser beam 5 draws a groove at the upper side of the workpiece 2 and the cutting gap 24 is no longer defined over the entire thickness d of the workpiece 2.

In the incomplete cutting action shown in FIG. 2, the slag can no longer be driven downwards out of the cutting gap 24, instead, it flows counter to the feed direction, e.g., in the negative X direction in FIG. 1, backwards in the only partially defined cutting channel. The iron oxide (FeO) of the construction steel produced during the reaction with the cutting oxygen has in this instance a lower density than the original iron (Fe). As a result both of the reduction of the FeO density and the mass increase of the oxidation, the volume of slag produced is consequently subjected to a volume increase with respect to the base material of the workpiece 2, which leads to the slag which cannot be discharged downwards being discharged from the cutting gap 24 downstream towards the rear at the upper side 2a of the workpiece 2.

The occurrence of drops of slag oozing downstream of the interaction region 22 can be detected in an image B, e.g., a thermal image, of the monitored region 21 by the camera 10, as explained below with reference to FIGS. 3a to 3c, which each show an image B of the monitored region 21 in the NIR/IR range during construction steel flame-cutting. The thermal radiation is recorded with the camera 10 using a filter 13 which is permeable only for thermal radiation 8 in the near infrared or infrared range, the contours drawn illustrating the boundaries between regions of different intensity of the thermal radiation 8 of FIG. 1, the contours of the workpiece 2 not being able to be identified. The process or thermal radiation 8 detected in the image B is an inherent radiation of the laser cutting process which cannot typically be compared directly with a temperature distribution. Nonetheless, for reasons of simplification, the measured intensity distribution I of the camera 10 is also referred to as a thermal image. The image B taken by the camera 10 is delimited by the circular inner contour 6a of a nozzle opening 6b of the laser cutting nozzle 6 of FIG. 1.

Figure 3A:
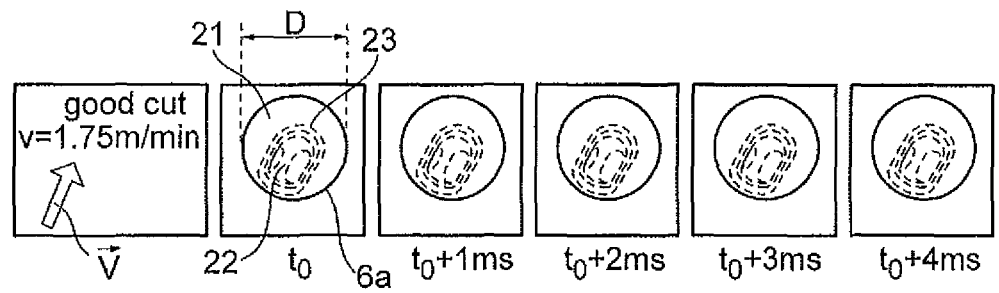
FIG. 3a shows a thermal image of an interaction zone taken with an image recording device in the event of a good cut.
Figure 3B:
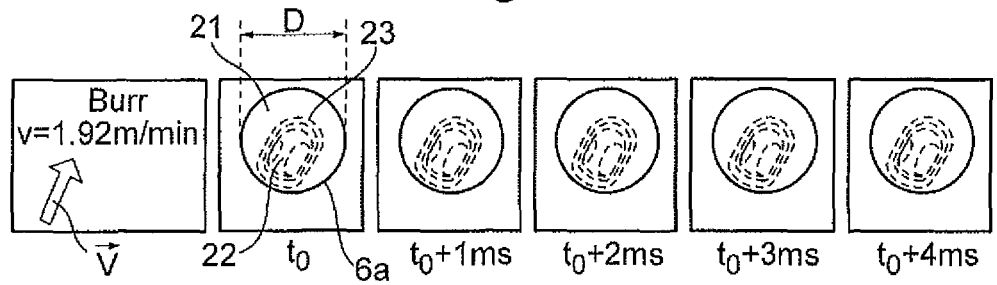
FIG. 3b shows a thermal image similar to FIG. 3a when burr formation is present.

Both in the event of a good cut, e.g., FIG. 3a, v=1.75 m/min., and in the event of the formation of burrs, e.g., FIG. 3b, v=1.92 m/min, in the coaxially taken sequence of five images B which are taken starting from a predetermined time $t_0$ at intervals of 1 ms, no distinctive features can be seen. The geometric shape of the interaction region 22 or the cutting gap (not shown) and the radiation emission of the melt at the cutting front 23 between the individual images B of the sequences shown are substantially homogeneous.

Figure 3C:
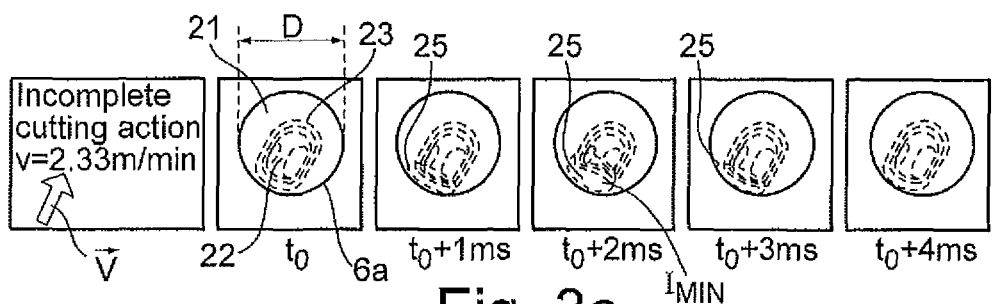
FIG. 3c shows a thermal image similar to FIG. 3a when an incomplete cutting action is present.

In the sequence of five images B shown in FIG. 3c, however, distinctive features can be seen in the second to fourth image B, and clear drops of slag in the rear region of the inner contour 6a of the laser processing nozzle 6. The circular inner contour 6a of the laser cutting nozzle 6 delimits in this instance the image B taken by the camera 10. Diameter D of the inner contour 6a in the present example is about 1.4 mm. The zone of the monitored region 21 in which the drops of slag 25 occur is characterised in FIG. 3c in each case by an elliptical marking.

In order to detect the drops of slag 25, the image B taken may in particular be evaluated in the vicinity of the inner contour 6a of the laser processing nozzle 6 by an evaluation device 18 of FIG. 1. In this instance, the direction of the feed direction v relative to the image B taken of the device 1 or the evaluation device 18 is known, so that the evaluation of the image B can ideally be limited to a comparatively small region at an end of the interaction region 22 opposite the cutting front 23.

For the identification of the drops of slag 25, it may be sufficient for the occurrence of a local intensity minimum $I_{MIN}$ to be detected at the end of the interaction region 22 opposite the cutting front 23. Additionally or alternatively, the detection can also take place by means of the identification of a change of the geometry of the end of the interaction region 22 opposite the cutting front 23 between a plurality of images taken, e.g., when the outer edge thereof changes from a convex, e.g., into a concave geometry, as is the case in the third image B of the sequence shown in FIG. 3c.

The thermal images B can optionally be compared, e.g., at wavelengths in the visible range, with detected material delimitations, e.g., contours of the workpiece 2, in order to improve the detection of the drop of slag 25. The detection of the drops of slag 25 may also optionally be carried out without taking a thermal image, e.g., only based on the detection of material delimitations. In this instance, an externally illuminated image of the interaction region 22 can be produced and the drops of slag 25 can be detected when the surface or the upper side 2a of the workpiece 2 can no longer be seen in the region of the drop of slag 25. It is further self-evident that, for parallel detection of material delimitations and the thermal image, the image recording device 10 may also have additional cameras or detectors.

The repeated occurrence or detection of drops of slag 25 is detected by the evaluation device 18 as an incomplete cutting action. It is advantageous in this instance that there is during the flame-cutting no other occurrence of error which causes drops of slag 25 which are discharged to the rear in an upward direction from the cutting gap 24 so that, in this instance, it is a clear feature of an incomplete cutting action in the construction steel. Based on this feature, it is therefore possible to clearly determine an occurrence of the cutting error "incomplete cutting action construction steel". In the event of a good cut or formation of burrs, as shown in FIG. 3a and FIG. 3b, such a slag flow has not yet been observed since, in the event of a good cut and also when the formation of burrs is present, the slag is discharged downwards from the cutting gap 24.

The evaluation device 18 is also connected in technical signal terms to a control or regulation device 19 which is also shown in FIG. 1. The control or regulation device 19 controls or adjusts the laser cutting process in accordance with characteristic parameters of the laser cutting process determined by the evaluation device 18, such as, for example, the presence of an incomplete cutting action. The control/regulation device 19, at the beginning of the incomplete cutting action, can adapt the cutting parameters of the laser cutting process in an appropriate manner in order to counteract an incomplete cutting action when the laser cutting process is continued. Alternatively, however, it is also possible for the control or regulation device 19 to interrupt or optionally to restart the cutting process when the incomplete cutting action is identified in order to reprocess the relevant location and to completely cut through the workpiece 2 in the region affected by the incomplete cutting action.

Reliable detection of cutting defects, e.g., an incomplete cutting action, improves productivity, with costs being saved as a result of reject components not being produced and time being saved as a result of finishing work not being necessary. The detection of an incomplete cutting action described in this instance can also be carried out with other cutting processes, e.g., fume cutting processes, with other high-energy beams, for example, with plasma beams. The detection of the incomplete cutting action is also not limited to high-grade steel, specifically to construction steel, as a workpiece material, but can also be used with other materials.

A number of embodiments of the invention have been described. Nevertheless, it will be understood that various modifications may be made without departing from the spirit and scope of the invention. Accordingly, other embodiments are within the scope of the following claims.

What is claimed is:

1. A method of detecting an incomplete cutting action when cutting a workpiece with a high-energy beam, the method comprising:
   obtaining an image of a region of the workpiece as the high-energy beam cuts the workpiece, the region including an interaction region of the high-energy beam with the workpiece;
   evaluating the image to detect a presence of slag at a receding end of the interaction region that is opposite to an advancing front of the interaction region, wherein the slag is discharged in an upward direction from a cutting gap in the workpiece towards an upper side of the workpiece on which the high-energy beam is incident; and
   determining that the high-energy beam has not completely cut through the workpiece from the upper side to a lower side of the workpiece based on the detection of the presence of the slag.

2. The method of claim 1, wherein obtaining the image comprises obtaining a thermal image of the interaction region.

3. The method of claim 1, wherein obtaining the image comprises obtaining an externally illuminated image of the interaction region.

4. The method of claim 1, wherein obtaining the image comprises obtaining the image of the interaction region coaxially relative to a beam axis of the high-energy beam.

5. The method of claim 4, wherein obtaining the image comprises detecting process radiation that has been reflected from the workpiece and that has passed through a nozzle opening of a processing nozzle through which the high-energy beam also passes.

6. The method of claim 5, wherein evaluating the image comprises evaluating a portion of the image that is adjacent to an edge of an inner contour of the nozzle opening.

7. The method of claim 1, wherein evaluating the image comprises detecting the presence of the slag based on a local intensity minimum occurring in the image at the receding end of the interaction region that is opposite to the advancing front of the interaction region.

8. The method of claim 1, wherein evaluating the image comprises detecting the presence of the slag based on a change of a geometry of the interaction region at the receding end thereof opposite the cutting front.

9. The method of claim 1, further comprising: in response to determining that the high-energy beam has not completely cut through the workpiece, modifying a power of the high-energy beam, altering a focal point of a laser processing head, or altering a spacing between the laser processing head and the workpiece so that the high-energy beam cuts through the workpiece.

10. The method of claim 1, further comprising: in response to determining that the high-energy beam has not completely cut through the workpiece, interrupting cutting of the workpiece.

11. A device for detecting an incomplete cutting action when cutting a workpiece with a high-energy beam, the device comprising:
an image detector configured to obtain an image of a region of the workpiece as the high-energy beam cuts the workpiece, the region including an interaction region of the high-energy beam with the workpiece during the cutting of the workpiece; and
an image processor configured to evaluate the image to detect a presence of slag at a receding end of the interaction region that is opposite to an advancing front of the interaction region, wherein the slag is discharged in an upward direction from a cutting gap in the workpiece towards an upper side of the workpiece on which the high-energy beam is incident, and
to determine, based on detecting the presence of slag, that the high-energy beam has not completely cut through the workpiece from the upper side of the workpiece to a lower side of the workpiece.

12. The device of claim 11, wherein the image detector is configured to obtain a thermal image of the interaction region.

13. The device of claim 11, wherein the image detector is configured to obtain an externally illuminated image of the interaction region.

14. The device of claim 11, wherein the image detector is configured to obtain the image of the region coaxially relative to a beam axis of the high-energy beam.

15. The device of claim 14, wherein the image detector is configured to obtain the image of the interaction region from process radiation that has been reflected from the workpiece through a nozzle opening of a processing nozzle through which the high-energy beam also passes.

16. The device of claim 15, wherein the image processor is configured to evaluate a portion of the image that is adjacent to an edge of an inner contour of the nozzle opening.

17. The device of claim 11, wherein the image processor is configured to detect the presence of the slag based on a local intensity minimum occurring in the image at the receding end of the interaction region that is opposite to the advancing front of the interaction region.

18. The device of claim 11, wherein the image processor is configured to detect the presence of the slag based on a change of a geometry of the interaction region at the receding end thereof opposite the cutting front.

19. A cutting system comprising:
a beam source configured to generate a high-energy beam;
a processing head arranged to guide the high-energy beam onto a workpiece; and
a cut quality evaluator for detecting that the high-energy beam has not completely cut through the workpiece from an upper side of the workpiece on which the high-energy beam is incident to a lower side of the workpiece, the evaluator comprising:
an image detector configured to obtain an image of an interaction region of the high-energy beam with the workpiece during cutting of the workpiece with the high-energy beam; and
an image processor configured to evaluate the image to thereby detect a presence of slag at a receding end of the interaction region that is opposite an advancing front of the interaction region, wherein the slag is discharged in an upward direction from a cutting gap in the workpiece towards the upper side of the workpiece, and to determine, based on detecting the presence of the slag, that the high-energy beam has not completely cut through the workpiece from the upper side of the workpiece to the lower side of the workpiece.

20. The cutting system of claim 19, further comprising a cutting controller coupled to the cut quality evaluator, wherein the cutting controller is configured to, in response to receiving an indication from the cut quality evaluator that the high-energy beam is not completely cutting through the workpiece, modifying a power of the high-energy beam, altering a focal point of a laser processing head, or altering a spacing between the laser processing head and the workpiece so that the high-energy beam cuts through the workpiece.

* * * * *